A. V. ANDERSON AND A. M. MORGAN.
TIRE CASING.
APPLICATION FILED JAN. 2, 1920.
1,351,015.
Patented Aug. 31, 1920.
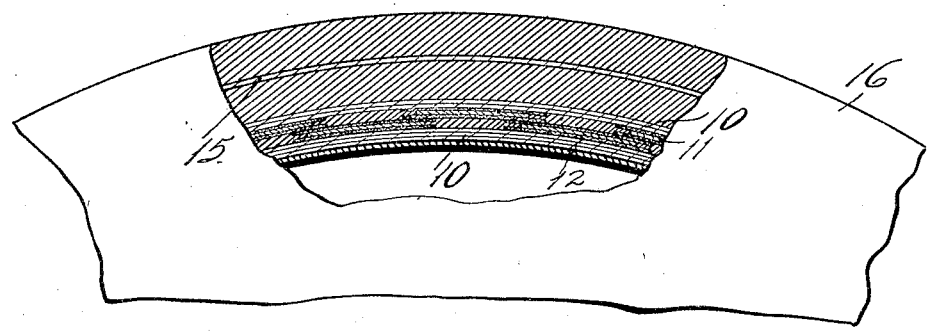
Fig. 1.
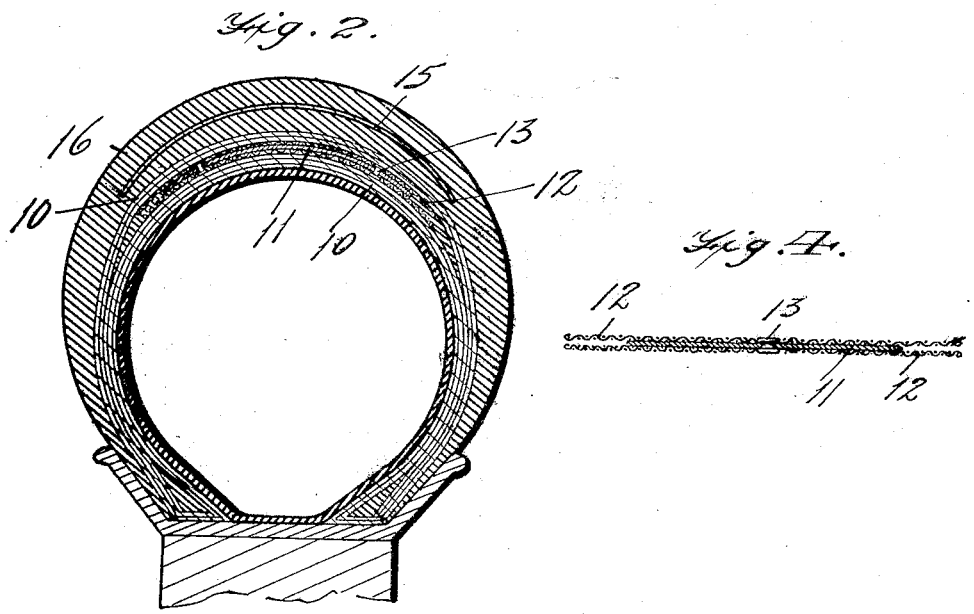
Fig. 2.
Fig. 4.
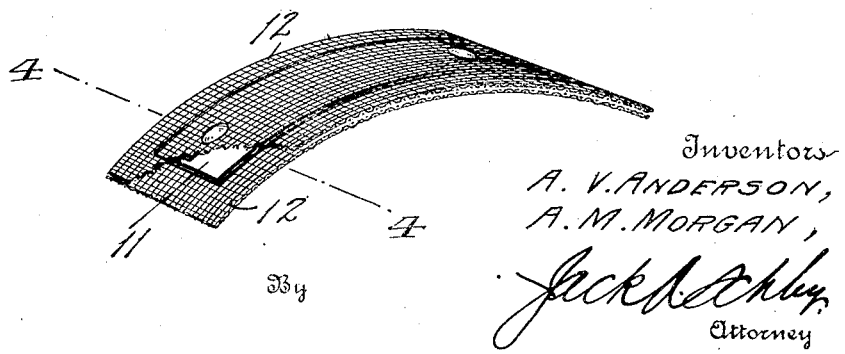
Fig. 3.
Inventors
A. V. ANDERSON,
A. M. MORGAN,
By Jack A. Ashley,
Attorney

UNITED STATES PATENT OFFICE.

ARTHUR V. ANDERSON AND ALFRED M. MORGAN, OF FORT WORTH, TEXAS, ASSIGNORS TO FORD TIRE & RUBBER COMPANY, OF FORT WORTH, TEXAS, A TRUST ESTATE.

TIRE-CASING.

1,351,015.        Specification of Letters Patent.     Patented Aug. 31, 1920.

Application filed January 2, 1920. Serial No. 348,800.

*To all whom it may concern:*

Be it known that we, ARTHUR V. ANDERSON and ALFRED M. MORGAN, citizens of the United States, residing at Fort Worth, in the county of Tarrant and State of Texas, have invented certain new and useful Improvements in Tire-Casings, of which the following is a specification.

This invention relates to new and useful improvements in tire casings.

The object of the invention is to produce a puncture-proof casing and provide a more efficient and practical structure.

One of the features is to embed puncture resisting plates in the casing in such a manner as to prevent said plates separating from the rubber and becoming loose. Considerable trouble and inefficiency has arisen from the loosening of plates in this character of casings now in common use. Where separate plates are used and become loose, they soon work out through the casing.

In carrying out the invention we employ a plurality of plate sections, each being provided with a pervious element so that when said section is dipped in a rubber compound, the latter will adhere and completely surround the plate; thus when the section is embedded in the casing and the latter vulcanized the compound will unite with the rubber and fasten the plate in such a manner as to preclude loosening.

The invention will be more readily understood from a reading of the following specification and by reference to the accompanying drawings, in which an example of the invention is shown, and wherein;

Figure 1 is a view of casing including the invention, a portion being illustrated in section and a portion in elevation, Fig. 2 is a transverse section of a complete tire, rim and felly, Fig. 3 is an isometric view of one of the sections, and Fig. 4 is a transverse sectional view on the line 4—4 of Fig. 4.

In the drawings the numeral 10 designates the inner rubber and fabric layers of which a tire casing is usually built. After some of these layers have been built up a series of transverse puncture resisting elements are mounted transversely on the top layer. Each element comprises a curved plate 11 interposed between sheets 12 of pervious or foraminous material. The sheets have a greater area than the plate so as to project beyond the same on all sides and are suitably fastened to the plates, as by rivets 13. We prefer to make the plates of resilient sheet metal, but do not wish to be limited to such material. The sheets 12 may be of wire netting or any other suitable material.

Before the elements or sections are placed in the tire they are dipped in a mixture of rubber cement and asbestos flour, which may be made in the proportion of one pound of asbestos flour to one gallon of rubber cement. The ordinary commercial rubber cement may be used. The cement mixture lodges between the sheets and the openings thereof thus completely covering the plates and the sheets.

The sections are disposed transversely of the casing in overlapping order, the parts being so placed that the adjacent edges of alternate plates overlap the underlying edges of the intermediate plates, but this particular arrangement may be varied.

When the sections have been placed they are covered with additional layers 10. The usual rubber tread including a fabric breaker strip 15 is next laid on and the casing is complete.

The casing is placed in a mold and vulcanized. It will be seen that when the casing is vulcanized the rubber cement mixture of the sections will unite with the rubber of the layers and the wire netting or fabric will be so thoroughly embedded between said layers that the plate could not possibly work loose; although the casing will be pliable and have the desired resiliency. It is obvious that the casing will be puncture proof and may be easily retreaded.

What we claim, is:

In a tire casing, a carcass formed of fabric and rubber, and puncture preventing means embedded in the tread portion of the carcass, such means comprising a plurality of separate transverse sections, each separate transverse section being formed of a transverse imperforate plate and sections of wire fabric arranged upon the outer and inner faces of the imperforate plate, said sections of wire fabric extending beyond the opposite sides and ends of the imperforate plate for substantial distances, means connecting the imperforate plate near its ends with the end portions of the wire fabric, the separate transverse sections being arranged in overlapping relation with their imperforate plates overlapping.

In testimony whereof we affix our signatures.

ARTHUR V. ANDERSON.
ALFRED M. MORGAN.